Patented Dec. 12, 1944

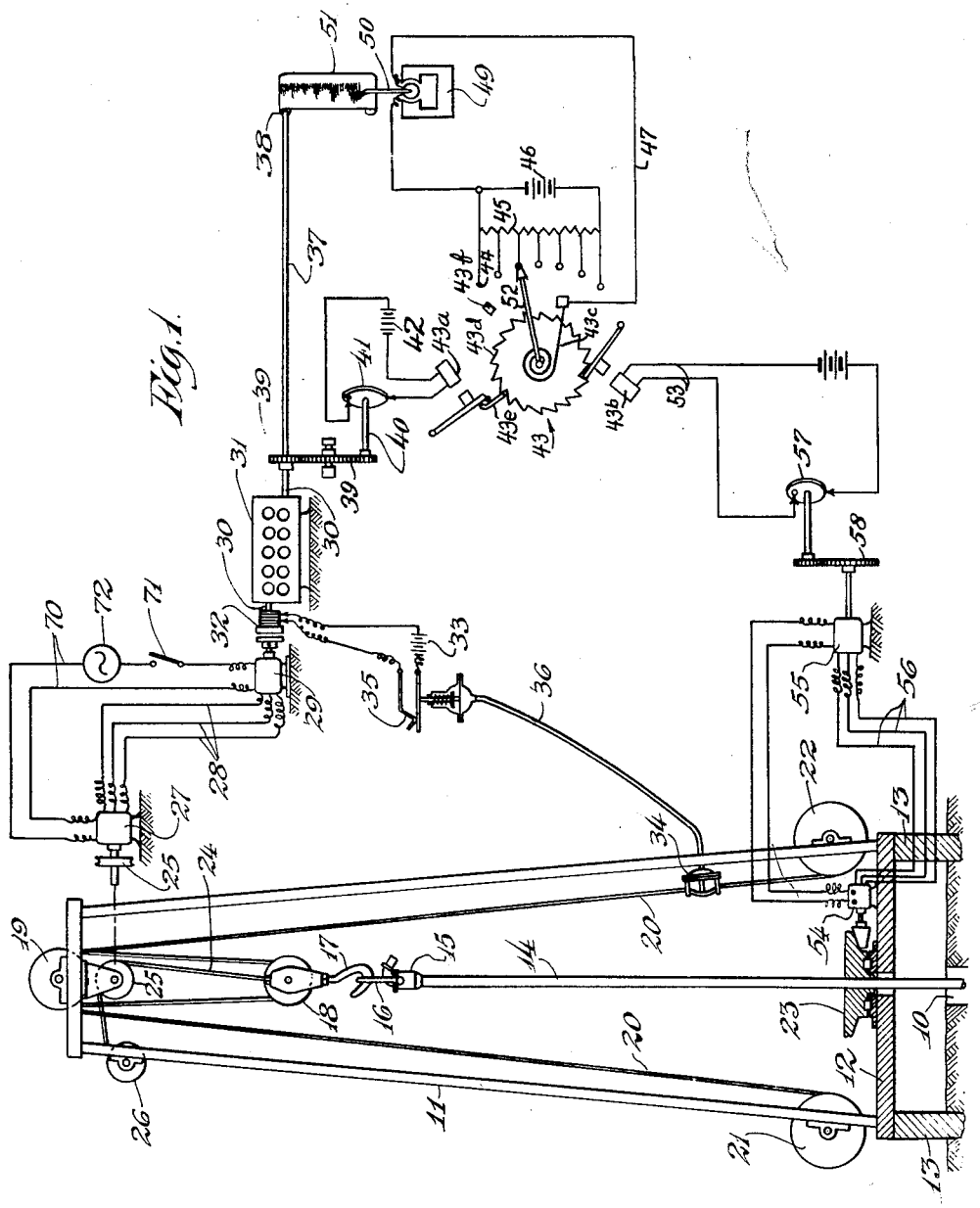

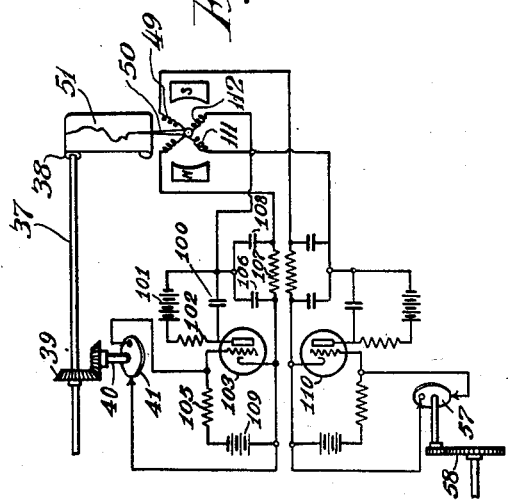
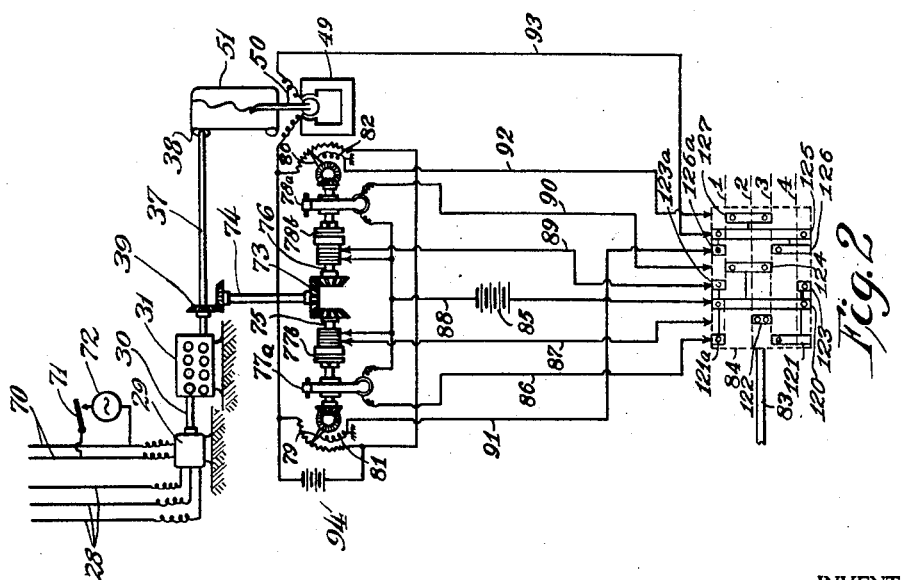

2,365,014

UNITED STATES PATENT OFFICE 2,365,014

APPARATUS FOR DRILLING RATE LOGGING

Daniel Silverman and Robert W. Stuart, Tulsa, Okla., assignors to Stanolind Oil and Gas Company, Tulsa, Okla., a corporation of Delaware Application July 25, 1940, Serial No. 347,569

3 Claims. (Cl. 234—1.5)

This invention relates to the art of logging wells during the drilling thereof and more particularly to a method and apparatus for logging wells being drilled by the rotary method involving the measurement of the rate at which the drill bit penetrates the various strata encountered.

For many years well drillers operating rotary rigs have been able to discern to a limited extent by the behavior of the rotating mechanism when there has been a change in the nature of the formation being drilled, and some efforts have been made to systematize and obtain permanent records of this sort of information. For example, spaced marks have been made on the Kelly joint, and the time required to drill a distance equal to the interval between them noted. Furthermore, the same principle has been applied to an automatically recording system in which a mark is made on a clock-driven chart for each foot or other selected distance of hole drilled, so that a measure of drilling rate is obtained. In another system the position of the Kelly joint or traveling block is recorded on a chart moving at a constant speed, thus providing data for the calculation of drilling rate.

The systems mentioned above and other similar ones have a number of disadvantages, among which are the following: (1) The desired type of record is not obtained and calculation is necessary to make it readily understandable. (2) Prior methods have not been truly automatic in that they require manual manipulation or subsequent interpretation to eliminate the errors which would otherwise arise during the addition of new stands of pipe and similar operations. (3) Prior systems have given no direct indication of drilling rate which is the primary quantity it is desired to evaluate. The best possible log is one in which the drilling rate is plotted directly against the depth of the bit and provision for obtaining such a log is a feature of our invention.

Our invention comprises a system of drilling rate logging which is free from the disadvantages enumerated above and gives an accurate log of the relative rates of drilling through the various strata traversed by the drill bit. Furthermore, it includes a preferred form in which the drilling rate is recorded in terms of revolutions of the drill bit rather than in terms of time, since the rate of penetration per unit of time may be meaningless if the speed of rotation varies more than a small amount.

It is therefore an object of our invention to provide a novel method and apparatus for obtaining a log of the drilling rates at which a rotary drill bit penetrates the various formations encountered during a rotary well drilling operation. Another object is to provide completely automatic apparatus for making such a log and for making it in a form immediately understandable and usable. Still another object is to provide apparatus for recording a log of the rate of drilling per revolution of the drill bit. A further object is to provide apparatus for drilling rate logging giving a record wherein drilling rate is plotted directly against depth. Further objects, advantages and uses of our invention will be apparent from the following detailed description read in conjunction with the drawings, in which:

Figure 1 illustrates diagrammatically one form of apparatus according to our invention as applied to a conventional rotary rig;

Figure 2 represents a modified drilling rate logging apparatus according to our invention, and Figure 3 shows schematically a further modification falling within the scope of our invention.

In one of its broad aspects our invention comprises the production of an indication of the rate of drill bit penetration into the formation being drilled as a function of the number of revolutions of the drilling bit and recording that indication on a medium moving with a velocity proportional to the rate of bit penetration with respect to time. In this way the drilling rate can be recorded directly against indicia representing the depth at which the drill bit is located. Preferably the drilling rate indication is of a type such that no computation or interpretation is necessary in order to make it usable. In other words, the indication should be such that its amplitude is responsive to the true drilling rate. Examples of methods of carrying out the above will be described hereinafter and in the course of that description many important details of our invention will be fully brought out.

Referring now to Figure 1, the upper portion of a well 10 is shown which is being drilled by the rotary method. The rotary drilling apparatus is conventional and is shown in very simplified form. This apparatus includes a derrick structure 11 having a floor 12 and mounted on foundation members 13. A string of drill pipe having a drill bit (not shown) at its lower end and Kelly joint 14 and mud swivel 15 at its upper end is supported from the upper portion of derrick 11 by means of bail 16, hook 17, travelling block 18, crown block 19 and cable 20. One end of cable 20 is wound upon draw works drum 21 and as shown, the other end, known as the dead line, is wound upon drum 22, although it can be merely anchored to some portion of the derrick structure. Mounted upon derrick floor 12 is a rotary table 23 for the purpose of rotating Kelly joint 14 and hence the entire drill string.

It is deemed unnecessary to describe the operation of drilling, adding new stands of drill pipe, etc. since all of these operations are well-known to those skilled in the art. As mentioned above, however, the rate of penetration per revolution of the drill bit into the formation being drilled and hence the rate at which the Kelly joint or travelling block is lowered per revolution of the drill bit is a quantity which bears a significant relationship to the nature of that formation. In order to measure this drilling rate it is therefore essential to provide some means of following the downward movement of the drill string. There are a large number of methods available for accomplishing this but a preferred method is shown by way of example in Figure 1. A wire line 24 is attached at its lower end to travelling block 18 and passes over a pulley 25 located substantially directly above travelling block 18 and thence to drum 26 upon which it is wound and which is provided with a spring having a strength sufficient to keep line 24 in slight tension regardless of the position of travelling block 18. Obviously both drum 26 and pulley 25 rotate in a manner dependent upon the vertical movement of travelling block 18 and hence of the entire drill string. We have chosen in this instance to utilize pulley 25 as the means for providing depth indications and for this purpose a Selsyn transmitter 27 is illustrated connected to pulley 25. Any rotation of pulley 25 is therefore transmitted by means of transmitter 27 and conductors 28 and 70 to the corresponding Selsyn receiver 29 which is preferably located a short distance away from the drilling rig and which is utilized to drive the rest of the logging apparatus according to this embodiment of our invention.

It is apparent that Selsyn receiver 29 will rotate at a speed and in a direction corresponding to the raising and lowering of the travelling block 18, but in order to measure drilling rate it is desired merely to utilize the downward motion of the drill string and hence of travelling block 18 when drilling is actually in progress. In order to accomplish this, shaft 30 driven by Selsyn motor 29 is provided with means for preventing the operation of the recording apparatus except during the actual drilling. As shown, this means takes the form of a depth counter 31 and a clutch 32. Clutch 32 is a magnetic clutch which is engaged only when electrical current from battery 33 passes through its coils, and its purpose is to prevent the operation of shaft 30 and the apparatus driven thereby except when the movement of travelling block 18 is associated with a corresponding movement of the entire drill string and drill bit. This magnetic clutch can suitably be composed of an electromagnet mounted on the shaft and provided with two brushes suitably insulated from the case and attached to the coil contained within, and a flat ferromagnetic plate mounted on the corresponding associated shaft in such a manner that it will rotate with the shaft but may be moved longitudinally with respect to it. This last can be accomplished, for example, by slotting the shaft and mounting the plate loosely on the shaft with a pin going through the slot. In the present instance this is accomplished by using a weight indicator 34 on the dead line which is arranged to actuate switch 35 through a hydraulic connection 36, whenever the load carried by cable 20, and hence that carried by travelling block 18 exceeds a predetermined value.

The rotation of shaft 30, which is proportional to the vertical movement of the drill bit at any moment, actuates depth counter 31 which is of a type having a maximum revolution counter and preferably has an algebraic counter as well. The algebraic counter is a simple direct drive revolution counter connected directly to shaft 30 and producing its indications in the upper set of dials of depth counter 31. Thus when the revolution of shaft 30 reverses, the reading on the upper set of dials of the depth counter 31 decreases. The maximum revolution counter is likewise driven from shaft 30 by a pair of gears (not shown) and can be, for example, a rotary ratchet counter which revolves only in one direction, being restrained from rotation in the opposite direction by the ratchet enclosed therein. This maximum revolution counter produces its indications on the lower set of dials on depth counter 31; for example, depth counter 31 can be made up of a Veeder-Root counter N-245 (direct drive revolution counter) to which is coupled a Veeder-Root L-245 rotary ratchet counter, the two being mounted in a common case as is quite customary in the counter art. The revolution counter 31 by itself and without connection with the rest of the apparatus of our system constitutes no change from the prior art. Such a dual type counter involving an algebraic counter and a maximum revolution counter is shown, for example, in the Hayward U. S. Patent 2,166,212. The maximum revolution counter then indicates the depth of the hole and the algebraic counter the depth of the drill bit. It is, of course, not necessary that counter 31 be of an indicating type, but only that it have the maximum revolution counting feature described. Counter 31 is equipped with an output shaft 37 driven by the maximum revolution mechanism and this serves two purposes. First, it actuates recorder reel 38 so that the recording medium actuated by reel 38 registers the depth of the well at a given time. Second, by means of a gear box 39 and shaft 40 an electrical contacting device 41 is caused to close the circuit including battery 42 and rotary switch 43 momentarily with a frequency proportional to the rate of drill bit penetration. Switch 43 is preferably of the rotary telephone type having a large number of contacts 44, for example twenty-five or fifty such contacts. Such a switch, for example, is shown on page 25, catalog 4071-B of the American Automatic Electric Sales Company. These contacts 44 are connected to successive points along a resistance 45 across which a battery 46 is shunted. It will be apparent that the resistance 45 and battery 46 form a voltage divider whereby the voltage applied across the recorder 49 varies in accordance with the particular point along the resistance on which the arm 52 bears. Therefore, the amount of current flowing through leads 47 and 48 to recorder 49 depends solely upon the position of the arm 52 of rotary switch 43, that is, upon which of contacts 44 is in use. Recorder 49 is provided with a pen arm 50 arranged in such a way that the electrical variations impressed upon it are recorded upon recording medium 51, as the latter is moved by reel 38.

The operation of rotary switch 43 is such that each time on electrical contact is made by contactor 41, switch arm 52 is moved from one of contacts 44 to the next in a given direction. This is accomplished because current flows through the upper solenoid 43a of rotary switch 43 which thereby attracts the corresponding arm 43e of the step by step feed mechanism which moves the center ratchet wheel 43d one notch in a counter-clockwise direction for each actuation of the solenoid 43a, against the action of spiral spring 43c attached to the ratchet wheel. When the lower solenoid 43b of this switch 43 is energized by passing on electric current through conductors 53, the flexible release lever associated with solenoid 43b is pulled downward, thus releasing the ratchet wheel 43d permitting it to rotate under the influence of the spiral spring 43c in a clockwise direction, to its original position. This position is against stop 43f. Obviously, therefore, if arm 52 is returned to its initial position at regular intervals, the maximum travel of switch arm 52 and hence the maximum deflection of pen arm 50 in each cycle will represent the drilling rate per unit of time and recording medium 51 will show a plot in which the drilling rate per unit of time is plotted against the depth of the well. By suitably regulating the number of contacts may by contactor 41 per foot drilled this record can be made to have all of the usefulness of a smooth curve, although it is the maxima of the various deflections which are significant.

Generally, we prefer to obtain an indication of the rate of drilling per revolution of the rotary table rather than per unit of time, and apparatus for accomplishing this is shown in Figure 1. A second Selsyn transmitter 54 is arranged to rotate at a speed proportional to that of rotary table 23 and is connected to Selsyn receiver 55 by means of conductors 56, the latter in turn driving a rotary contactor 57 through a gear box 58. Contactor 57 is connected in series with battery 59 and conductors 53 so that each time the circuit is closed by contactor 57 switch arm 52 returns to its zero position and the number of contacts 44 traversed by switch arm 52 between each of these impulses applied through leads 53 is a measure of the drilling rate per revolution of the rotary table, and it is this quantity which is recorded on recording medium 51.

It will be apparent from the above that we have provided a novel system for logging a well during the drilling thereof by the rotary method in which a record is obtained showing the rate of drilling through the various formations encountered. There are many other ways of achieving substantially the same results within the scope of our invention and one of these is shown in Figure 2, to which reference is now made. For convenience corresponding parts are designated by reference characters corresponding to those shown in Figure 1.

The drilling apparatus proper is not shown since it may be the same as that illustrated in Figure 1, the vertical movements of the drill string being translated into corresponding rotational movements of Selsyn motor 29 via conductors 28 and 70 in the manner already described. Also, as in Figure 1, the motion of motor 29 is transmitted through shaft 30 and depth counter 31 to a gear box 39, shaft 37 and reel 38 upon which recording medium 51 winds. However, in place of the clutch previously described for restricting the motion of the various parts of the recording apparatus to those times during which drilling is actually taking place, we can utilize a simple switch in the field circuit of the Selsyn transmitter-receiver set. In Figure 2 a portion of this circuit is shown consisting of two conductors 70 extending to the Selsyn transmitter (not shown), with a switch 71 and a source of alternating current 72, such as an AC generator, connected across them. When switch 71 is open Selsyn receiver 29 will not follow the movements of the corresponding Selsyn transmitter in the derrick and consequently such operations as adding new sections of drill pipe, reaming, replacing drill bits, etc. can be carried on without causing any motion of the recording system. Switch 71 can be located in any convenient place in the vicinity of the drilling rig, one excellent location being near the clutch pedal controlling the rotation of the rotary table, this arrangement being such that the circuit is closed while the rotary table is operating, but otherwise is open. By means of this arrangement the switch 71 will require little attention since the rotary table is seldom rotated except when drilling is actually being carried on. Many alternative arrangements are, of course, possible.

A differential 73 actuated from gear box 39 by shaft 74 drives two shafts 75 and 76 which drive potentiometer arms 79 and 80, respectively. Potentiometer arms 79 and 80 are urged to their zero positions by means of springs 81 and 82, and are alternately held in advanced positions by means of magnetic brakes 77a and 78a, respectively. These brakes can be any of the customary solenoid-operated brakes adapted to grip a shaft and prevent its rotation when current is applied through the solenoid. On shafts 75 and 76, between the beveled gears and the brakes 77a and 78a are mounted magnetic clutches 77b and 78b, which can be, for example, of the same type shown in Figure 1 and which operate in the same fashion. When no electric current is passing through the coil of either of these magnetic clutches the corresponding shaft will be disconnected from the potentiometer arm drive.

Shaft 83, which may be arranged to rotate at a constant speed or at a speed proportional to the rate of rotation of the rotary table carries a rotary switch 84 having a number of contacts 120 to 127 respectively, arranged so that in each revolution thereof magnetic brakes 77a and 78a and magnetic clutches 77b and 78b will be actuated in the desired manner by means of battery 85 and conductors 86, 87, 88, 89 and 90. Also, the arrangement is such that potentiometer arms 79 and 80 are alternately connected to recorder 49 by means of conductors 91, 92 and 93, the potentiometers being energized by battery 94.

The operation of the apparatus of Figure 2 is as follows: Assuming that the contacts of switch 84 are in position 1 and that potentiometer arm 79 is in zero position, it will be seen that current from battery 85 is flowing through contact 120, contact 124 and conductor 90, thus energizing brake 78a. At this instant no current is flowing through contact 121a so that brake 77a is not energized. No current flows through conductor 87; clutch 77b is not energized and arm 79 is disconnected from shaft 75. Shaft 76 is likewise disconnected from arm 80, since no current flows through conductor 89. Arm 80 is held in position by brake 78a. As soon as switch 84 reaches position 2, however, the circuit including contacts 120 and 122, conductor 87 and battery 85 is made, magnetic clutch 77b connects the potentiometer arm actuating mechanism to shaft 75 and potentiometer arm 79 moves from its zero position as shaft 75 continues to rotate, thus attaining an increasing electrical potential. This situation continues until switch 84 approaches position 3, which may represent either a desired interval of time or a predetermined number of revolutions of the rotary table. When switch 84 reaches position 3, brake 78a is released, and arm 80 is permitted to reassume a zero position under the influence of the spring 82. During this time and until position 1 is reached, potentiometer arm 79 is fixed in the most advanced position attained during the interval of movement, since the contacts 120 and 122 no longer connect lead 87 to clutch 77b while brake 77a is connected during this period to the battery 85 through conductor 86 and contacts 120 and 121. The potential of arm 79 is applied to meter 49 and recorded on recording medium 51 by means of pen arm 50. As is apparent from the drawing this is accomplished by connecting conductors 91 and 93 when switch 84 reaches position 3, and during the entire interval between positions 3 and 1, the same value continues to be recorded. During the same interval, of course, arm 80 returns to zero position and again is advanced by means of clutch 78b, and the potential corresponding to the most advanced position attained by it will be recorded during the interval from position 1 to position 3. Finally, when switch 84 reaches position 4, current is caused to flow through conductors 86 and 89 thus completing the cycle. This cycle of operation is apparent from a study of the contacts of rotary switch 84.

It is apparent that the record on medium 51 will show a plot of the drilling rate versus the depth of the hole. By using a sufficiently small unit of time or rotation this record will be a continuous drilling rate curve. The same result can be achieved by other means. For example, Figure 3 illustrates a purely electrical method of recording drilling rate.

An electrical circuit is shown in Figure 3 which operates by recording the frequency of the electrical pulses caused by the closing of the contactor 41 driven by shaft 40 and gear box 39, as in Figure 1. The operation of this circuit is as follows: Condenser 100 is charged by battery 101 through resistance 102 and the accumulated charge is imposed upon the plate of Thyratron tube 103, the grid of which is biased negatively by means of battery 109 through resistance 105. As is well known in the art, the Thyratron tube has the property of being non-conducting until the negative grid potential decreases to a predetermined value, dependent upon circuit conditions, whereupon the current in the plate circuit instantaneously rises to its maximum value, independent of the existing grid potential. Current continues to flow in such tubes until the anode circuit is opened or the anode voltage is lowered to a small value, whereupon the plate current suddenly ceases until the tube is again activated by a decrease in grid potential. In the present instance, therefore, each time contact is made by contactor 41 the grid bias battery 109 is short-circuited, thereby reducing the negative bias to such a point that current instantaneously flows at its maximum value in the plate circuit of tube 103. In each case the plate current will consist of a definite charge, namely, that which had been stored in condenser 100. That current which has passed through the plate circuit of the Thyratron tube 103 passes into condenser 106 and then is further averaged with respect to time by means of resistance 107 and condenser 108 and finally passes to one coil 112 of the ratiometer-type recorder 49.

In order to produce a record of the drilling rate per revolution of the rotary table it is only necessary to add a similar circuit operating on contactor 57 driven in proportion to the rate of rotation of the rotary table, and to apply the output from this circuit to the other coil of the ratio type meter 49. Thyratron tube 110 is fired by contactor 57 and the averaged current therefrom is impressed upon coil 111 of recorder 49 while the averaged current from tube 103 is impressed upon coil 112. The currents from the Thyratron tubes are applied to coils 111 and 112 in such a sense that the deflections produced by these currents are in opposite directions. Obviously the position assumed by these coils and by pen arm 50 will be determined by the ratio between the frequencies with which contacts are made by contactors 41 and 57 and hence by the bit penetration per revolution of the rotary table.

While we have described our invention in terms of certain specific embodiments thereof we do not desire to be limited thereto but only by the scope of the appended claims.

We claim:

1. Apparatus for recording the rate of penetration of a drill bit through formations penetrated in the course of a rotary drilling operation per unit number of revolutions of said bit, including means for advancing a record strip proportional to the descent of said drill bit, means for producing a series of electric impulses in direct proportion to the number of revolutions of said drill bit, means actuated by descent of said drill bit for producing an electric current varying directly in average amplitude with the descent of said drill bit, means for recording on said strip a quantity varying directly with said current, and means controlled by said impulse producing means for periodically limiting the recorded amplitude on said strip.

2. Apparatus for logging a well during a rotary drilling operation comprising means for advancing a record strip proportional to the descent of the drill, an electrical circuit including a resistance, an arm making contact with said resistance at one of a plurality of positions thereon, means for recording on said record strip an indication of the position of said arm on said resistance, means for moving said arm in accordance with the descent of the drill during said rotary drilling operation, and means actuated by the rotation of the drill and adapted to return said arm to its zero position each time that said drill rotates a predetermined amount.

3. Apparatus for logging a well during a rotary drilling operation comprising means for advancing a record strip proportional to the descent of the drill, an electrical circuit including a resistance, an arm making contact with said resistance at one of a plurality of positions thereon, means for recording on said record strip an indication of the position of said arm on said resistance, means for producing electrical impulses in accordance with the descent of the drill bit, means actuated by each of said impulses for moving said arm by one position in a given direction, and means actuated by the rotation of the drill and adapted to return said arm to its zero position each time that said drill bit rotates a predetermined amount.

DANIEL SILVERMAN.
ROBERT W. STUART.